United States Patent [19]
Goldstein

[11] 3,796,333
[45] Mar. 12, 1974

[54] DETACHABLE CARRIER FOR VEHICLES

[76] Inventor: Kenneth W. Goldstein, 9946 Warshire Dr., Olivette, Mo. 63132

[22] Filed: Aug. 13, 1971

[21] Appl. No.: 171,478

[52] U.S. Cl.......... 214/450, 224/42.03 B, 224/42.44
[51] Int. Cl. ............................ B60r 9/00, B60r 9/10
[58] Field of Search...224/42.03 R, 42.03 A, 42.03 B, 224/42.07, 42.08, 42.43, 42.44, 29 R; 287/65, 104; 214/450

[56] References Cited
UNITED STATES PATENTS

| | | | |
|---|---|---|---|
| 3,650,443 | 3/1972 | Hasket et al. | 224/42.03 A |
| 3,240,406 | 3/1966 | Logan | 224/42.03 B |
| 2,782,052 | 2/1957 | Albrecht et al. | 224/42.43 X |
| 3,428,332 | 2/1969 | McCance | 224/42.03 B UX |

Primary Examiner—Gerald M. Forlenza
Assistant Examiner—Jerold M. Forsberg
Attorney, Agent, or Firm—Richard G. Heywood

[57] ABSTRACT

A carrier unit is removably secured on a supporting bar member rigidly attached to a vehicle frame, the carrier unit including a mounting portion engaging and locking upon a mounting adapter carried by the bar member to obviate relative movement therebetween and a carrier deck attached to the mounting portion.

5 Claims, 8 Drawing Figures

PATENTED MAR 12 1974
3,796,333
SHEET 1 OF 2
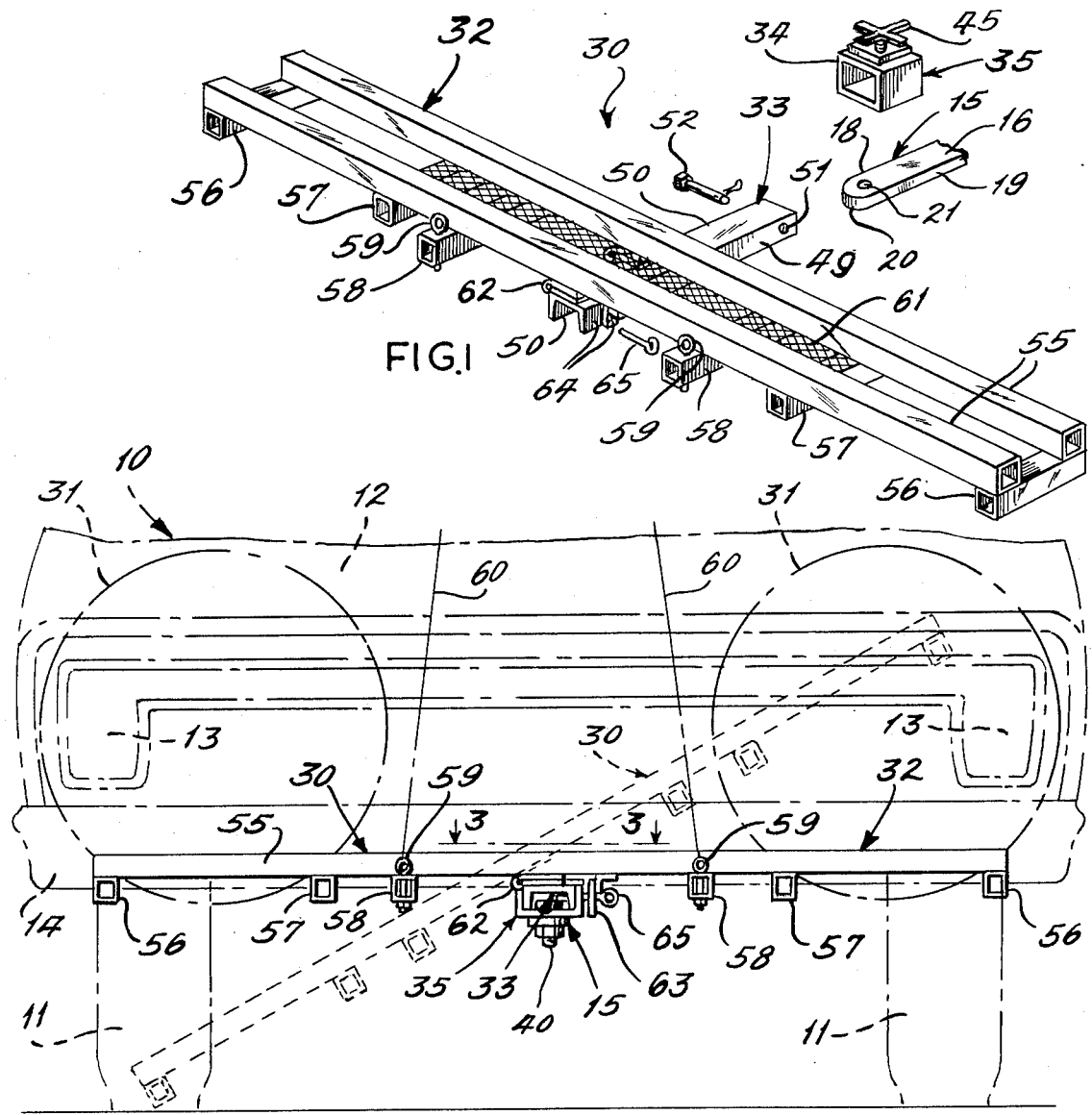
FIG. 1
FIG. 2
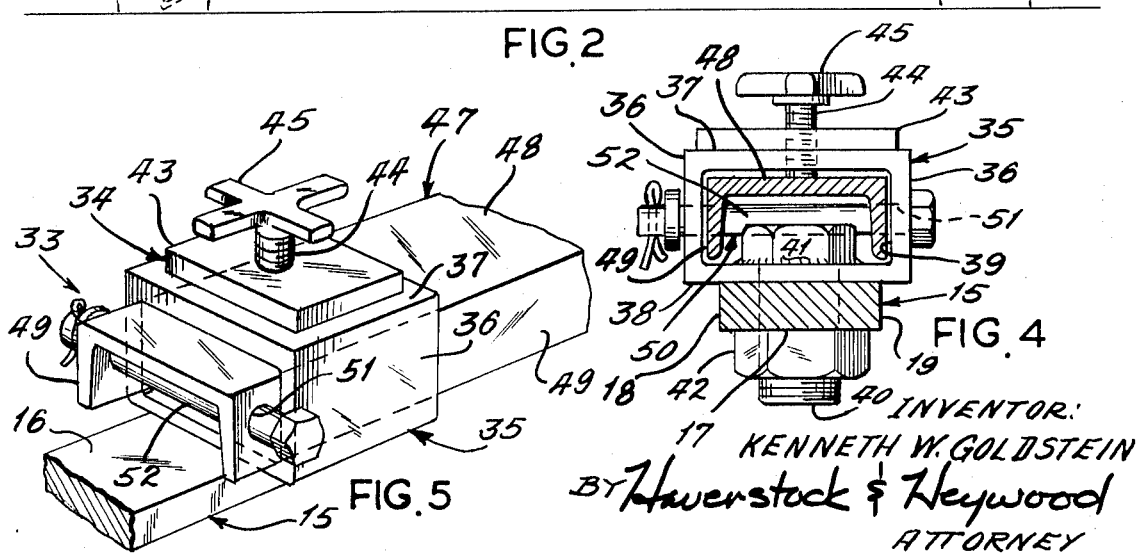
FIG. 5
FIG. 4
INVENTOR:
KENNETH W. GOLDSTEIN
BY Haverstock & Heywood
ATTORNEY

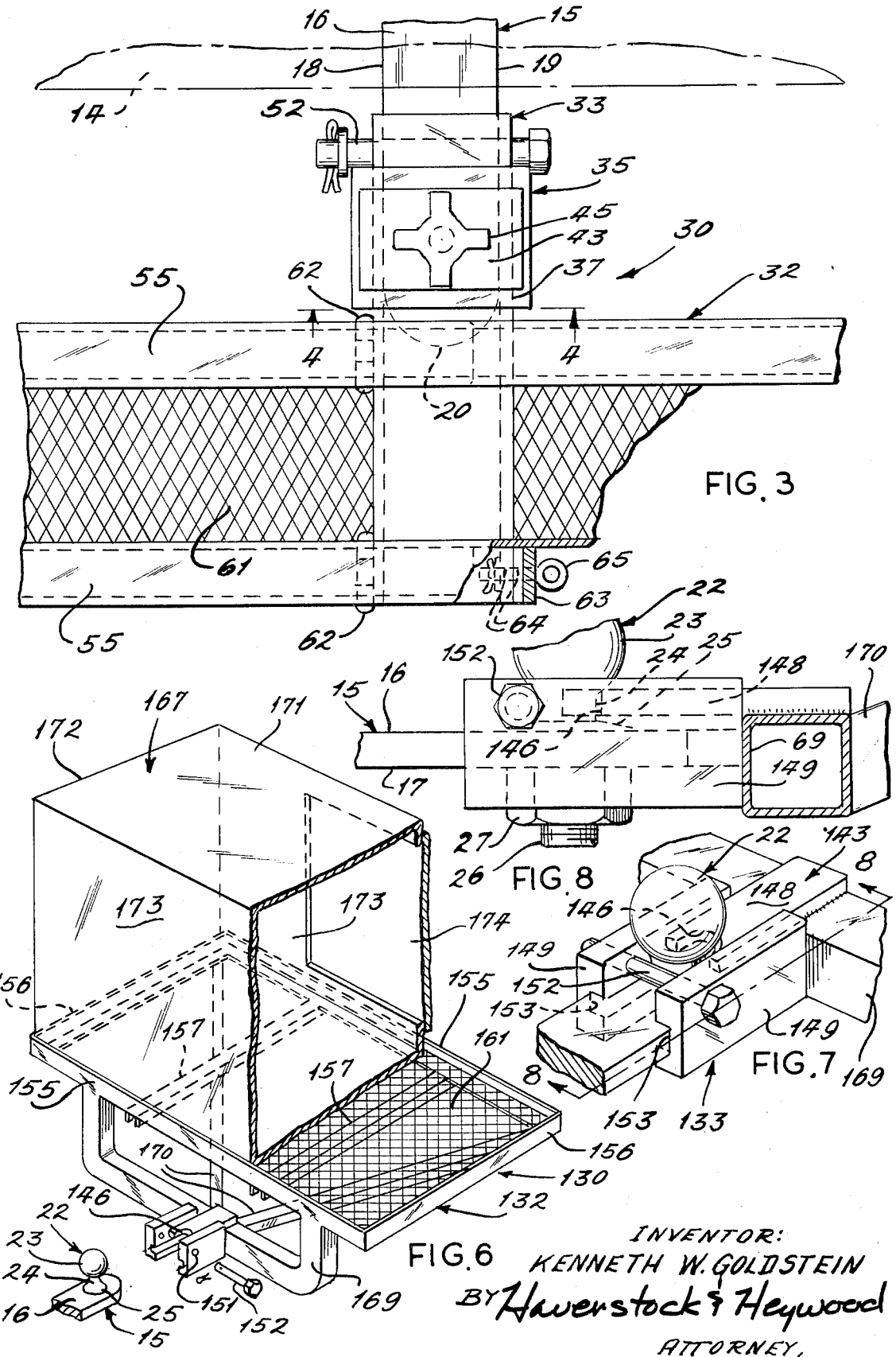

DETACHABLE CARRIER FOR VEHICLES

In the past many types of load carriers have been designed for attachment to vehicles in order to supplement the load transporting capacity thereof. The prior art shows bumper supporting carriers (3,228,576); and bumper mounted brackets for load carriers (3,240,455; 3,300,111 and 3,504,831) and frame and bumper brackets or support bars for carriers (3,158,302 and 3,202,332). The prior art also discloses a great variety of towing hitches utilized in attaching a trailer for cargo of some type. However, in the past, all vehicle attached carriers have utilized plural attachment or mounting means for carriers and, despite the availability of towing hitches, no one heretofore has utilized such means for rigidly attaching a carrier unit.

A principal object of the present invention is to provide a novel carrier unit adapted to be mounted on an existing hitch bar of a vehicle.

Another object is to provide a sturdy carrier attachment structure for safely supporting heavy loads from a single vehicle frame-mounted bar.

Another object is to provide a carrier unit supporting in a cantilevered position behind a vehicle on a rigid, centrally disposed mounting bar. Another object is to provide a novel carrier movable from an angular ground-engaging loading position to a horizontal transportation position for carrying a motorbike.

Still another object is to provide a carrier deck for supporting an enclosed housing for hunting dogs or other pets or animals.

Still another object is to provide a strong, safe and reliable carrier unit that is quickly attachable to and detachable from a single rigid mounting bar secured to a vehicle.

These and still other objects and advantages will become apparent hereinafter.

For purposes of illustration and disclosure, the invention is embodied in the parts and in the combinations or arrangements of parts hereinafter described and claimed. In the accompanying drawings which form a part of this specification and wherein like numerals refer to like parts:

FIG. 1 is an exploded perspective view of one embodiment of a detachable carrier for vehicles embodying the present invention, FIG. 2 is a rear elevational view of the carrier embodiment of FIG. 1 shown in operable transportation position on the rear of a vehicle (as shown in phantom lines) and also showing a loading position of the carrier in broken lines, FIG. 3 is an enlarged fragmentary top plan view, partly broken away, of the carrier as taken along line 3—3 of FIG. 2, FIG. 4 is a cross-sectional view of one embodiment of the mounting portion of the carrier as taken along line 4—4 of FIG. 3, FIG. 5 is a perspective view of the carrier mounting portion of FIG. 4, FIG. 6 is a perspective view, partly broken away, of another embodiment of a detachable carrier and closed transportation housing thereof, and showing a modified mounting portion, FIG. 7 is an enlarged, fragmentary perspective view of the modified carrier mounting portion of FIG. 6, and FIG. 8 is a side elevational view of the modified carrier mounting portion as taken along line 8—8 of FIG. 7.

For the purpose of illustrating detachable carrier units embodying the invention, the rear of a conventional passenger automobile 10 is shown in phantom lines in FIG. 2 and includes a rigid chassis or frame which is not shown, but on which the wheels 11, rear deck or trunk 12, tail lights 13 and rear bumper 14 are assembled. Detachable carrier units embodying the invention are particularly adapted for use in combination with conventional trailer hitches, and a typical trailer hitch tongue or bar 15 is centrally positioned at the rear of the vehicle 10 and rigidly secured to the vehicle frame in any conventional manner to project rearwardly behind the rear bumper 14. It will be understood that another or different supporting bar may be provided in lieu of the towing hitch tongue 15 and may be rigidly mounted to the vehicle frame in a similar manner to project rearwardly in central disposition behind the rear vehicle bumper. The hitch tongue or supporting bar 15 includes upper and lower surfaces 16 and 17 and outer side edges 18 and 19 with a rounded end 20. The tongue 15 also includes at least one vertical bore 21 adjacent to the end 20 normally used for mounting a ball hitch member 22 (FIGS. 6–8) having an upper ball portion 23 connected by a reduced annular hub 24 to a flaring collar 25 seated on the upper surface 16 and firmly secured on the tongue by an integral bolt 26 and lock nut 27 engaged against the lower surface 17. As will be seen, the ball hitch member 22 may be used as one form of a mounting adapter for the carrier units of the invention.

Referring now to FIGS. 1–5, one embodiment of the invention comprises a carrier 30 for a motorbike or like two-wheeled vehicle, which is indicated generally in FIG. 2 by phantom lines showing the front and rear wheels 31 only. The carrier 30 comprises a carrier deck portion 32 and a mounting portion 33 assembled together, the mounting portion being adapted to be firmly, but releasably engaged with a special mounting adapter 34 secured to the hitch bar 15 instead of the ball-type mounting adapter 22.

The mounting adapter 34 comprises a main housing 35 having opposed side walls 36 and top and bottom walls 37 and 38 defining an open-ended rectangular opening 39 to receive the carrier mounting portion 33, as will appear. A headed bolt 40 extends downwardly through the bottom wall 38 with the head 41 being located within the opening 39 and welded to the bottom wall 38, and the bottom wall is seated on the upper surface 16 of the tongue 15 with the bolt 40 extending through the hitch bar bore 21 and the adapter 34 being rigidly secured in place by a lock nut 42. The adapter 34 may also be provided with an upper plate 43 welded or the like to the top wall 37 and through which a tensioning bolt 44 having a cruciform handle 45 or the like is threadedly positioned for engagement with the mounting portion 33 in the opening 39.

Referring particularly to FIGS. 1, 4 and 5, the mounting portion 33 comprises an elongated, inverted channel-shaped member 47 having a horizontal wall 48 and opposed vertical side walls 49 for close tolerance sliding fit with the adapter 34. The channel member 47 is accommodated within the adapter opening 39 and substantially spans the distances between opposed walls to prevent relative vertical or horizontal angular movement therebetween, and the bolt head 41 is accommodated within the channel recess 50 defined by the depending side walls or flanges 49 of the member 47. Insertion of the mounting portion 33 in the mounting adapter 34 is limited by abutment of the carrier deck portion 32 against the main adapter housing 35 or special stop means (not shown) may be provided. As shown in FIG. 5, the channel member 47 through the opening 50 and the side walls 49 of the channel member 47 are provided with aligned bores 51 adjacent their free ends projecting beyond the adapter, and a cross-pin 52 is retained in the bores 51 in abutment with the main housing walls 36 to prevent relative longitudinal movement between the carrier unit and the supporting hitch bar 15, whereby it will be readily apparent that the carrier unit 30 is rigidly, but detachably, mounted on the vehicle 10 by a single, central mounting means to support the cantilevered carrier adjacent to the rear of the vehicle 10.

Referring now particularly to FIGS. 1-3, the carrier deck portion 32 of the carrier 30 comprises a tubular framework including a pair of longitudinal parallel frame members 55, the spacing of which accommodates, but narrowly confines, the wheels 31 of a motorbike or the like and is determined by a plurality of longitudinally spaced, transverse frame members 56, 57 and 58. It will be noted that the end cross frame members 56 and next adjacent frame members 57 are spaced apart a predetermined distance to receive and nest the wheels 31 of the motorbike, FIG. 2. The cross frame members 58 project beyond the longitudinal members 55 and are provided with eyelets 59 to which strap members 60 may be attached for firmly anchoring the motorbike to the carrier deck 32 for transportation. If desired, an expanded metal screen 61 or like decking may be provided between the cross members 57 to facilitate loading and unloading of the bike; as will now be described.

The carrier deck portion 32 is secured to the upper wall 48 of the mounting portion 33 by hinges 62 to permit the carrier deck to swing in one direction between the transportation position (shown in solid lines in FIG. 2) and the loading position (shown in broken lines in FIG. 2). An angle plate 63 or the like is rigidly secured beneath the outer longitudinal frame member 55 in opposed adjacent relation with one side wall 49 of the mounting portion 33, and aligned bores 64 are provided to receive a locking pin 65 to lock and maintain the carrier deck 32 on the mounting portion 33 in the horizontal transportation position.

In operation of the carrier unit embodiment 30 shown in FIGS. 1-5, the ball member 22 is removed from the standard hitch bar 15 already secured to the frame of a vehicle 10 or a special supporting bar 15 is secured to the vehicle frame. The mounting adapter 34 is then secured by extending the bolt 40 through the bore 21 and the lock nut 42 is snugged up against the lower bar surface 17 (it will be understood that the adapter 34 may have two longitudinally aligned bolts 40 to be secured in aligned bores provided in the supporting bar 15). The carrier unit 30 is then easily assembled on this supporting structure by sliding the channel member 47 into the adapter opening 39 and inserting the cross bolt 52 through the aligned bores 51 and applying the retaining means, such as a cotter pin or the like. The tensioning bolt 44 is then tightened down to further rigidify the mounting assembly. The motorbike carrier 30 is utilized by removing the lock pin 65 and moving the carrier deck 32 to the angular ground-engaging position and rolling the motorbike up the rampway defined by the longitudinal frame members 55 so that the wheels 31 rest in the open framework defined between the transverse frame members 56 and 57. The straps 60 are placed over the motorbike and secured to the eyelets 59. The carrier deck 32 is swung on hinges 62 to the horizontal transportation position before or after attaching the straps 60, and is locked to the mounting portion 33 by inserting the lock pin 65 through the bores 64 and retaining it there.

Referring now to FIGS. 6-8, other embodiments of the invention are shown and like parts are identified by like numerals in the "100" series except for the ball hitch member 22 previously identified as a mounting adapter. A modified form of the mounting portion 133 comprises a housing 143 having a horizontal wall 148 extending between opposed vertical channel members or side walls 149, the wall 148 having an arcuate recess 146 at its free end for abutment against the annular hub 24 of the ball member with the ball 23 being engaged between the side walls 149. Opposed channels or slots 153 are formed in the side walls 149 to receive the side margins 18 and 19 of the hitch tongue 15 and a cross-pin 152 extends through aligned bores 151 in the side walls 149 to abut the annular hub 24 of the mounting adapter 22 in opposition to the arcuate recess 146 to retain the mounting portion on the mounting adapter 22. It will be apparent that the slots 153 engaged with the sides of the tongue 15 prevent relative vertical or horizontal angular movement therebetween, and the close tolerance engagement of the arcuate recess 146 and keeper pin 152 with opposite sides of the annular hub 24 prevent relative longitudinal movement, whereby the carrier unit is rigidly, but releasably mounted on the vehicle 10.

Referring to FIG. 6, a modified carrier unit 130 comprises a flat cargo deck portion 132 for loading luggage or the like, and which may further be utilized as a pet transporting unit by attaching a closed housing 167. The cargo deck portion 132 comprises a horizontal rectangular angle-iron frame or the like having opposed longitudinal frame members 155 and opposed transverse end members 156 rigidly secured together. Intermediate transverse members 157 may be provided and the cargo deck 132 may be provided with an expanded metal deck or platform 161. The main frame also comprises a U-shaped tubular frame member 169 rigidly secured to the horizontal wall 148 and from which point diagonal supporting members 170 extend to the outer remote corners of the main frame for transferring the weight of the cantilever cargo deck back through the mounting unit to the vehicle frame. It should be noted that the U-shaped frame member 169 elevates the cargo deck 132 substantially above the level of the hitch bar 15 to facilitate the weight transference and, in addition, such elevation permits better visibility of tail lights 13 and license plates (not shown).

The pet housing 167 may comprise a suitable closed housing unit having top, opposed side and end walls 171, 172 and 173, respectively, with a door 174 for admitting the animal, such as a hunting dog. Preferably, the bottom is also enclosed and suitable ventilation openings provided. The housing 167 nests within the angle-iron framework of the cargo deck 167 and may be removably secured in place by suitable brackets.

From the foregoing, it will be seen that a novel detachable carrier unit is provided meeting the objects previously outlined. It will be apparent that either mounting portion 33 or 133 may be utilized with either carrier deck portion 32 or 132 depending upon whether the ball member 22 of the hitch bar 15 is utilized or the mounting adapter 34 substituted therefor.

Various changes and modifications of the invention will be apparent to those skilled in the art, and the scope of the invention is only limited by the claims which follow.

What is claimed is:

1. A wheelless carrier removably mountable on a single, centrally disposed, outwardly extending support bar rigidly secured to a vehicle frame; said wheelless carrier comprising a mounting portion including a mounting adapter and channel means, said mounting adapter comprising a main housing having a rectangular opening therethrough and means for securing said main housing to said support bar adjacent to its outer end, said channel means being releasably engageable with one of said support bar and mounting adapter and comprising an inverted channel member having a first wall extending across said opening in one direction and opposed second walls extending across said opening on lateral sides in transverse directions, locking means retaining said channel means in assembled position with said mounting adapter, and a carrier deck assembled on said mounting portion and connected thereby to the support bar only in cantilevered position behind the vehicle.

2. The wheelless carrier according to claim 1 in which said carrier deck is hingedly connected to said mounting means for swinging movement between a ground-engaging loading position and a horizontal transportation position, and means for locking said carrier deck to said mounting means in said last-named position.

3. The wheelless carrier according to claim 1 in which said carrier deck is rigidly secured to said mounting means and comprises a cargo deck positioned adjacent to and above said support bar.

4. The wheelless carrier according to claim 1 in which said carrier deck comprises a closed housing rigidly secured by said mounting means to said support bar.

5. The carrier according to claim 1 in which a tension bolt is provided on said mounting adapter for releasable engagement with one of said walls of said mounting means.

* * * * *